C. F. STREET.
MECHANICAL STOKER FOR LOCOMOTIVES.
APPLICATION FILED MAY 24, 1912. RENEWED FEB. 9, 1915.
1,195,532.
Patented Aug. 22, 1916.
6 SHEETS—SHEET 3.
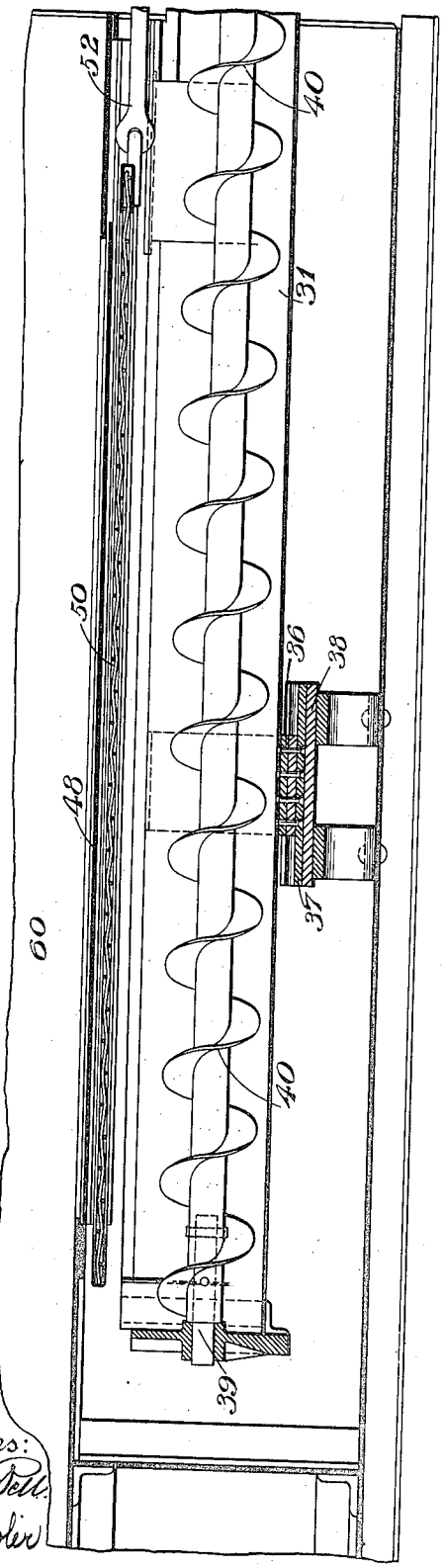
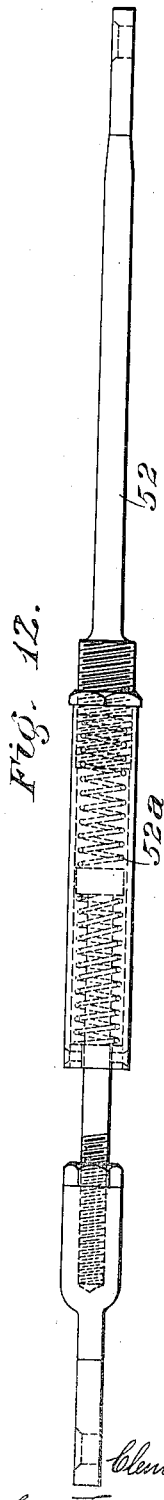
Witnesses:
Inventor
Clement F. Street
by Edward Wright Atty.

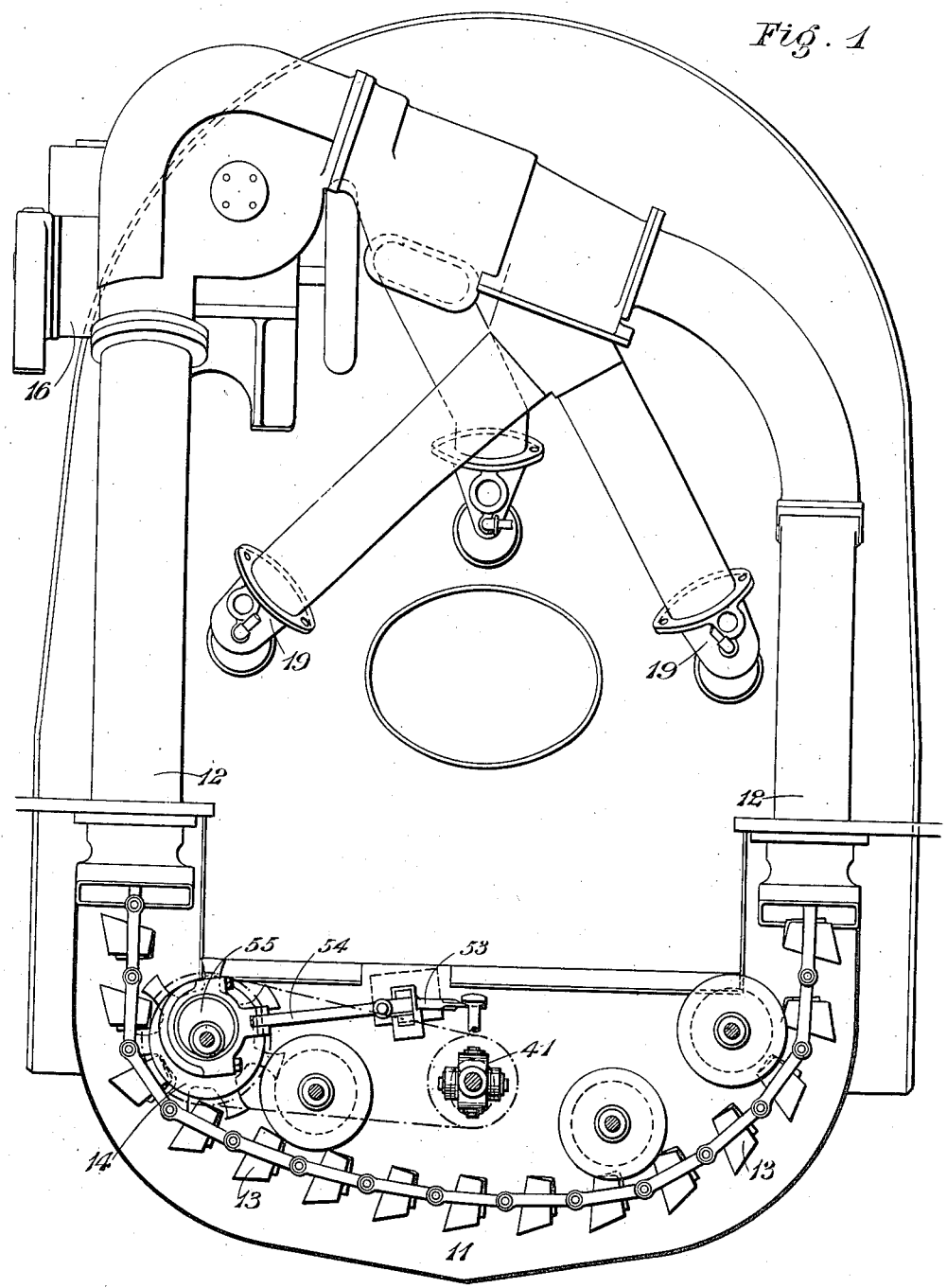

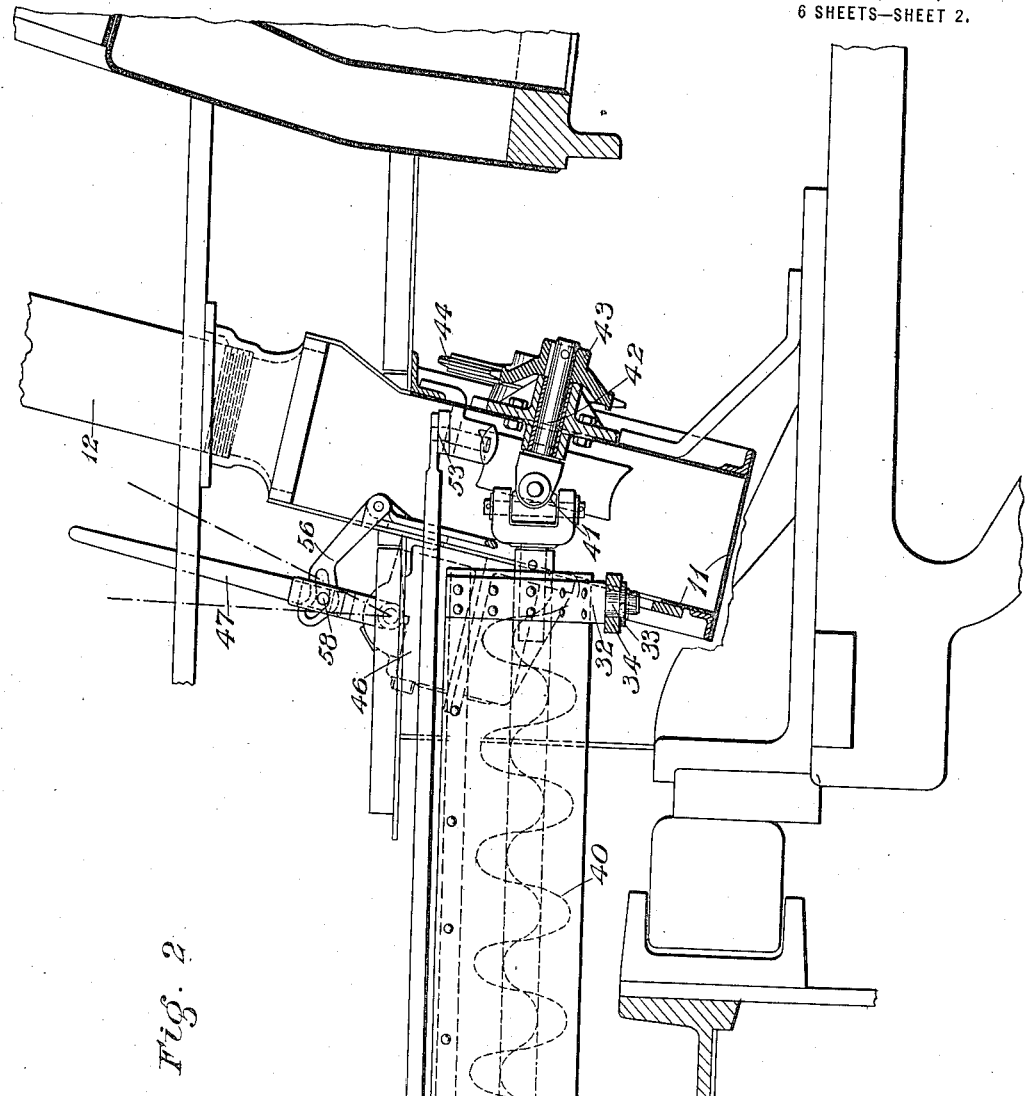

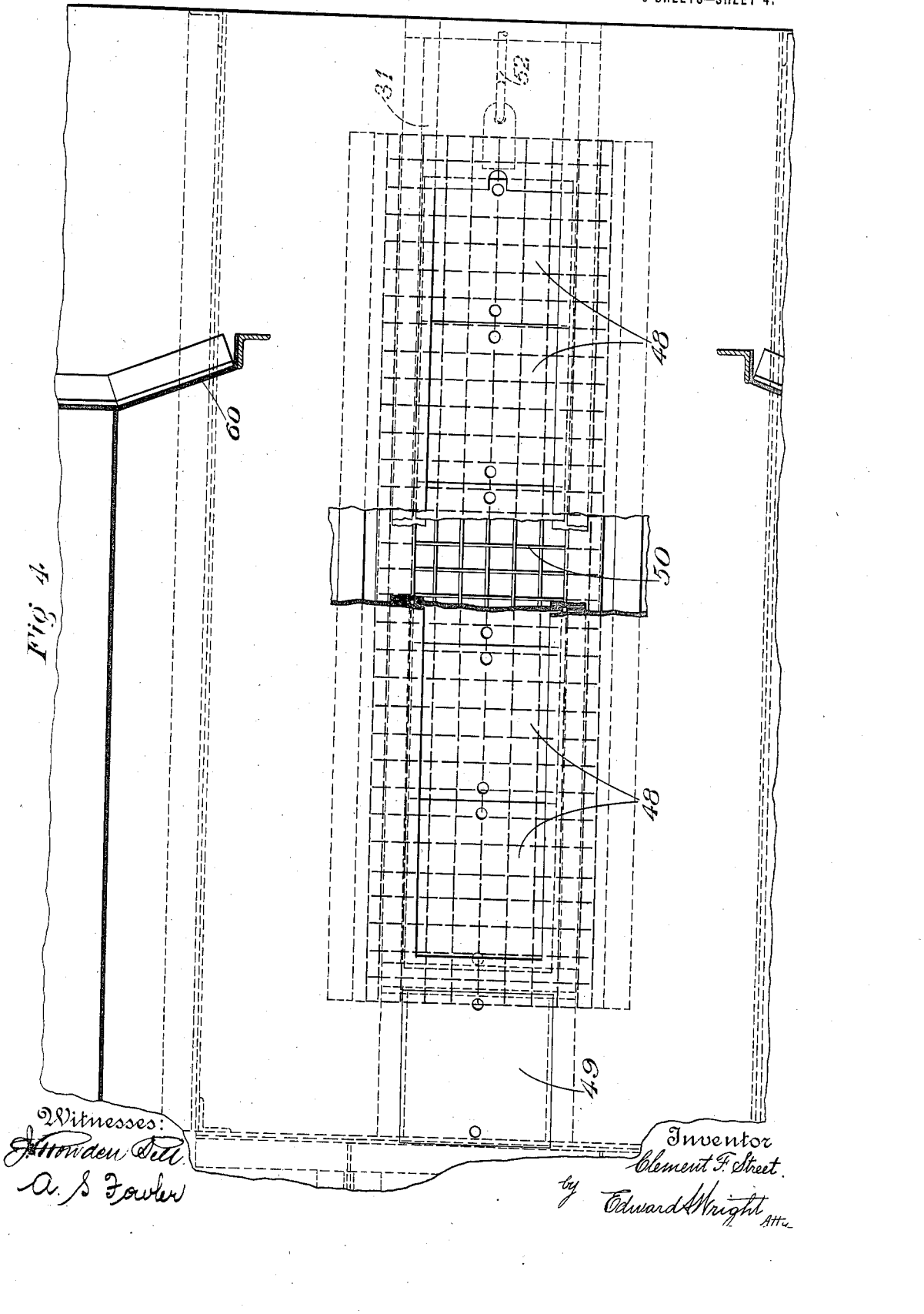

C. F. STREET.
MECHANICAL STOKER FOR LOCOMOTIVES.
APPLICATION FILED MAY 24, 1912. RENEWED FEB. 9, 1915.
1,195,532.
Patented Aug. 22, 1916.
6 SHEETS—SHEET 5.
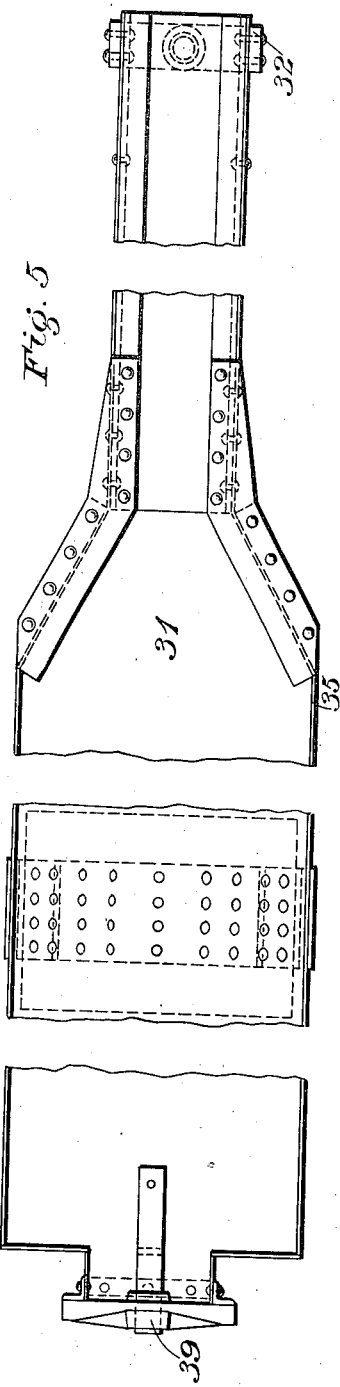
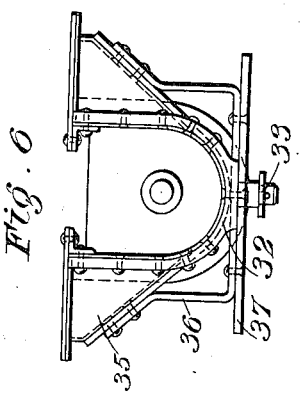
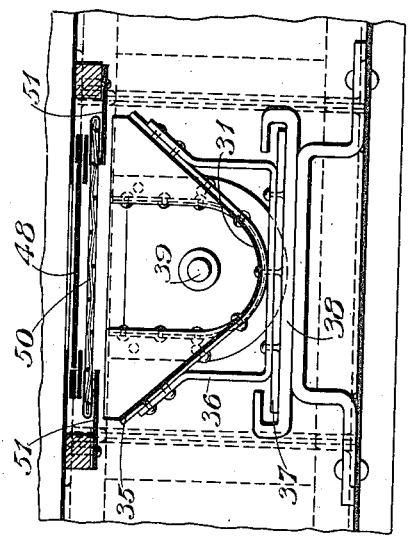
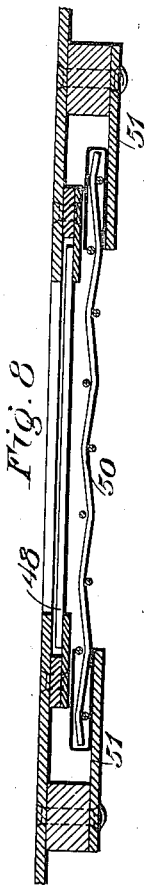

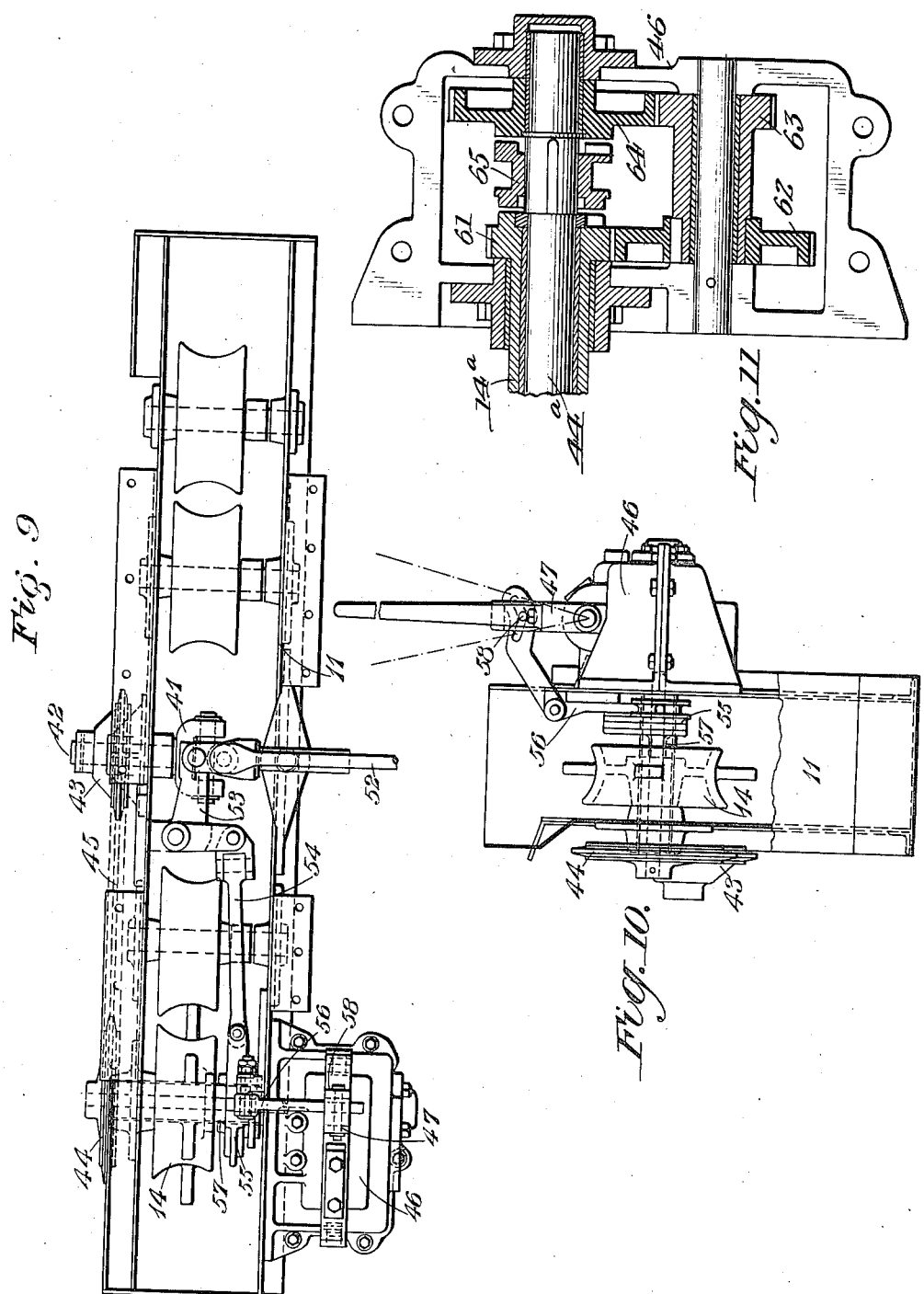

UNITED STATES PATENT OFFICE.

CLEMENT F. STREET, OF SCHENECTADY, NEW YORK, ASSIGNOR TO THE LOCOMOTIVE STOKER COMPANY, OF WILMERDING, PENNSYLVANIA, A CORPORATION OF PENNSYLVANIA.

MECHANICAL STOKER FOR LOCOMOTIVES.

1,195,532.      Specification of Letters Patent.      Patented Aug. 22, 1916.

Application filed May 24, 1912, Serial No. 699,359. Renewed February 9, 1915. Serial No. 7,104.

*To all whom it may concern:*

Be it known that I, CLEMENT F. STREET, a citizen of the United States, residing at Schenectady, in the county of Schenectady and State of New York, have invented certain new and useful Improvements in Mechanical Stokers for Locomotives, of which the following is a specification.

This invention relates to mechanical stokers for furnaces, and more particularly for furnaces of locomotives.

Certain of the features of this present invention are especially designed for use in connection with locomotive stokers of what is known as the "scatter type," such as shown and described in my prior application Ser. No. 565,579, filed June 7, 1910, in which the fuel is delivered from the tender to a receptacle beneath the floor of the cab of the locomotive, and from which it is raised by an elevator, and delivered to the several distributers which spread the same over the grate area of the furnace.

One of the objects of my present invention is to provide an improved conveyer device and means for operating same from the locomotive, for delivering the fuel from the tender into the receptacle on the locomotive; and another object is to provide improved means for automatically feeding the fuel from the bin on the tender into the conveyer for carrying the same to the locomotive.

In the accompanying drawings: Figure 1 is a transverse section through the fuel receptacle on the locomotive, showing the elevator and the locomotive boiler in elevation; Fig. 2, a longitudinal section of the fuel receptacle and the forward portion of the conveyer, and showing also a portion of the tender; Fig. 3, a longitudinal section of the floor of the tender beneath the fuel bin, and showing the rear portion of the conveyer and the screen for feeding the fuel into the conveyer trough; Fig. 4, a plan of the fuel bin of the tender with a portion of the floor broken away to show the screen more clearly; Fig. 5, a plan of the conveyer trough with sections broken away; Fig. 6, an end elevation of the same, taken at the forward end; Fig. 7, a transverse section through a portion of the tender floor, showing the screen and the conveyer trough beneath the same; Fig. 8, a transverse section, showing the screen and floor plates, on a larger scale; Fig. 9, a horizontal section of the fuel receptacle on the locomotive, and showing the connections for driving the conveyer and for operating the screen; Fig. 10, a side view of the fuel receptacle with a portion of the casing removed to show the sprocket wheel and means for throwing the mechanism into and out of gear; Fig. 11, a horizontal section of the gear box showing one form of change speed gearing; and Fig. 12, a view showing a modified form of rod which may be used for shaking the screen.

According to the construction shown in the drawings, the fuel receptacle or hopper, 11, is mounted on the locomotive beneath the deck or cab floor and communicates with the upright conduits, 12, containing the chain and bucket elevator, 13, which is driven by an engine, 16, and carries the fuel up to the distributing pipes leading to the distributers, 19, from which it is distributed over the surface of the furnace grate, all as set forth in my prior application, above referred to.

According to one of the features of my present invention, I provide an improved conveyer device for transferring the fuel from the tender to the fuel receptacle on the locomotive, which device, according to the preferred construction, comprises a trough, 31, pivoted at its forward end upon the locomotive and arranged to discharge into the fuel receptacle, 11, and extending at its rear portion into the space beneath the floor of the fuel bin, 60, on the tender, as shown more particularly in Figs. 2, 3, and 7, of the drawings. This conveyer trough, which is also shown in detail in Figs. 5 and 6, is preferably rigid throughout its length, its forward portion between the locomotive and tender being preferably substantially U shaped in section, and provided with suitable strengthening angles or flanges and having a yoke, 32, with pivot pin, 33, mounted in a bracket, 34, on the casing of the fuel receptacle. The rear portion of the trough beneath the floor of the fuel bin on the tender is preferably flared out as at 35, for receiving the fuel as it falls through the opening in the bottom of the bin.

In order to provide for the sliding movement between the conveyer trough and the tender due to the relative movement between locomotive and tender, a yoke, 36, having a sliding plate, 37, may be attached to the rear portion of the trough and rest on a support, 38, secured to the tender.

A conveyer screw, 40, is mounted within the trough, 31, its forward end being driven through a universal joint connection, 41, from a short shaft, 42, having a bearing in the casing of the fuel receptacle and carrying a driving sprocket wheel, 43, while the rear end of the screw shaft, is mounted in a bearing, 39, at the rear end of the trough.

For the purpose of driving the screw from power on the locomotive, one of the wheels, 14, around which the elevator buckets and chain passes in the fuel receptacle, may be provided with sprockets and mounted on a shaft which drives the sprocket wheel, 44, which in turn drives the sprocket wheel, 43, through a gear or chain, 45. In order to provide for varying the speed at which the screw is driven, the shaft 14$^a$ of sprocket, 14, may be made hollow and extended into a gear box, 46, while the shaft 44$^a$ of sprocket, 44, extends through the hollow shaft into the gear box which may contain any suitable or preferred form of change speed gear interposed between said shafts, such as gears, 61, 62, 63 and 64, and a sliding clutch block, 65, operated by a handle or lever, 47, in the usual manner. The lever handle, 47, will then occupy an intermediate position, as shown in the drawings, when the clutch, 65, is left in middle position, indicated in Fig. 11, and the mechanism is out of gear, with the shafts disconnected, and may be moved in one direction for connecting up the low speed gear, 64, and in the opposite direction for throwing in the higher speed by connecting the hollow shaft directly to the inner shaft.

The opening in the bottom of the fuel bin of the tender is preferably provided with a plurality of removable plates, 48, arranged in line with each other for closing the opening entirely when all plates are in position, but adapted to be opened, first at the forward end by removing the front plate, then as the face of the pile of fuel recedes, removing the next plate, and so on, until the fuel bin is nearly empty when the last plate is removed. By this means, fuel may be readily admitted to the conveyer trough from any part of the fuel bin and all labor of moving the fuel from one part of the tender to another is avoided. Another plate, 49, may be located in the rear of the fuel plates, 48, for giving access to the rear bearing of the screw in the trough for lubricating and repair purposes.

In order to provide for automatically feeding the fuel from the tender through the openings into the conveyer trough, a vibratory screen, 50, is provided just beneath the fuel plates, 48, and the opening at the bottom of the fuel bin, the screen being of a suitable mesh to permit the passing of the proper sizes of lump fuel therethrough into the conveyer trough, 31. The screen is mounted in guides, 51, see Figs. 7 and 8, and for the purpose of imparting a continuous reciprocating movement to the screen, a rod, 52, may be attached to its forward end and extend to some movable part upon the locomotive. As shown in Figs. 2 and 9 of the drawing, the rod, 52, is connected to one arm of a bell crank, 53, pivoted upon a bracket on the casing of the fuel receptacle, 11, the other arm being connected by rod, 54, with eccentric, 55, mounted on the shaft of the driving sprocket wheel, 14. If desired, this eccentric may be mounted to slide upon said shaft, and be provided with a clutch, 57, adapted to be thrown into and out of connection with said sprocket by means of a lever, 56, one arm of which has a pin and slot connection, 58, with the lever handle, 47, of the change speed gear, so that when said handle is thrown in either direction from its intermediate position, the eccentric will be connected up to the sprocket for driving the reciprocating rod and shaking the screen.

The reciprocating rod, 52, may preferably be formed in two telescoping sections having a yielding or spring connection, 52$^a$, between them, as shown more in detail in Fig. 12, for the purpose of providing a connection which may yield in case a hard lump of fuel or other object should get stuck in the screen. The spring would then be compressed at each reciprocation of the rod, and the mechanism would continue to operate without danger of breaking any of its parts.

The elevator, 13, is driven at a certain speed by the small engine, 16, for raising the fuel from the hopper or receptacle on the locomotive to the pipes leading to the distributers, but the rate of supplying fuel from the tender to the receptacle by the screw conveyer, may be varied by shifting the lever of the change speed gear so as to furnish the desired quantity of fuel in receptacle at all times, at the same time, it will be noted, that whenever the lever is shifted from its cut out position to any speed position, the shaking mechanism is thrown into action and operates at the same speed, while the screw may be driven at different speeds.

Having now described my invention, what I claim as new and desire to secure by Letters Patent is:

1. In a mechanical stoker for a locomotive and tender, the combination with a fuel bin on the tender, a fuel receptacle on the locomotive, and means for feeding fuel therefrom to the furnace, of a rigid conveyer trough pivotally connected at its forward end to said receptacle and extending at its other end beneath the fuel bin on the tender, a conveyer in said trough, a support for the rear portion of the trough, and a plate slidably mounted on said support and rigidly secured to said trough.

2. In a mechanical stoker for a locomotive and tender, the combination of a fuel bin on the tender, a fuel receptacle on the locomotive, a chain and bucket elevator for raising fuel therefrom, a sprocket wheel driven by said elevator, a conveyer trough pivotally connected at its forward end to said receptacle and extending to the space beneath the fuel bin on the tender, a conveyer screw mounted in said trough and having a bearing supported in the casing of said receptacle, and a driving connection from said sprocket wheel to the forward end of said screw shaft.

3. In a mechanical stoker for a locomotive and tender, the combination of a fuel bin on the tender, a fuel receptacle on the locomotive, a trough extending therefrom to the space beneath the fuel bin on the tender, a longitudinal reciprocatory screen located over said trough, longitudinal guides supporting said screen, a conveyer in said trough, a rod connected to said screen and extending to the locomotive, and mechanism mounted on the locomotive for reciprocating said rod and for driving the conveyer.

4. In a mechanical stoker for a locomotive and tender, the combination of a fuel bin on the tender having a longitudinal opening at the bottom thereof, a plurality of movable fuel plates arranged in line with each other for closing said opening, a vibratory screen mounted beneath said fuel plates, a conveyer trough beneath said screen, a conveyer for conducting the fuel to the locomotive, and an operating mechanism for vibrating said screen.

5. In a mechanical stoker for a locomotive and tender, the combination of a fuel bin on the tender having a longitudinal opening at the bottom thereof, a plurality of movable fuel plates arranged in line with each other for closing said opening, a vibratory screen mounted beneath said fuel plates, a conveyer trough beneath said screen, a conveyer screw having a bearing at the rear end of the trough, and another plate beyond the rear end of the screen for giving access to said bearing.

6. In a mechanical stoker for a locomotive and tender, the combination with a fuel conduit on the locomotive and a power driven chain and bucket elevator for raising the fuel therefrom, of a trough extending to the tender, a conveyer mounted in said trough for delivering fuel to said elevator, a shaft having a sprocket wheel engaging with and driven by the elevator chain, a driving gear on said shaft, and connecting means operated by said gear for driving the conveyer.

7. In a mechanical stoker for a locomotive and tender, the combination with a chain and bucket elevator on the locomotive for raising fuel, and a sprocket wheel engaging with and driven by said elevator chain, of a trough extending from said elevator to the tender, a conveyer mounted in said trough, and connecting means operated by said sprocket wheel for driving the conveyer.

8. In a mechanical stoker for a locomotive and tender, the combination with a fuel conduit on the locomotive and a trough extending therefrom to the space beneath the fuel bin on the tender, of a movable screen supported over said trough and beneath the opening at the bottom of the bin, a conveyer in said trough, and mechanism for shaking the screen.

9. In a mechanical stoker for a locomotive and tender, the combination with a fuel conduit on the locomotive and a trough extending therefrom to the space beneath the fuel bin on the tender, of a reciprocatory screen supported over said trough and beneath the opening at the bottom of the bin, a conveyer in said trough, and operating mechanism on the locomotive and having a connection for reciprocating the screen.

10. In a mechanical stoker for a locomotive and tender, the combination with a fuel bin on the tender, a fuel receptacle on the locomotive, and a trough extending therefrom to the space beneath the fuel bin on the tender, of a screen located over said trough beneath the fuel opening at the bottom of the bin, guides for supporting said screen, and operating mechanism mounted upon the locomotive and having a connection extending to the tender for shaking said screen.

11. In a mechanical stoker for a locomotive and tender, the combination with a fuel bin on the tender, a fuel receptacle on the locomotive and a trough extending therefrom to the fuel bin on the tender, of a vibratory screen for feeding the fuel from the fuel bin into said trough, longitudinal guides for supporting said screen, a conveyer for the trough, and operating mechanism mounted on the locomotive for driving the conveyer and for shaking the screen.

12. In a mechanical stoker for a locomotive and tender, the combination with a fuel bin on the tender, a fuel receptacle on the locomotive, an elevator for raising fuel therefrom, and a trough extending from said receptacle to the fuel bin on the tender, of a vibratory screen for feeding fuel from the bin into said trough, and mechanism mounted on the locomotive and operated by the elevator for shaking said screen.

13. In a mechanical stoker for a locomotive and tender, the combination with a fuel bin on the tender, a fuel receptacle on the locomotive, and a trough extending therefrom to the fuel bin on the tender, of a vibratory screen for feeding the fuel from the fuel bin into said trough, a conveyer for said trough, a change speed mechanism operating on the locomotive for driving the conveyer at different speeds, and mechanism operating at a constant speed for shaking said screen.

14. In a mechanical stoker for a locomotive and tender, the combination with a fuel bin on the tender, a fuel receptacle on the locomotive, and a trough extending therefrom to the fuel bin on the tender, of a vibratory screen for feeding the fuel from the fuel bin into said trough, a conveyer for said trough, a change speed mechanism operating on the locomotive for driving the conveyer at different speeds, mechanism operating at a constant speed for shaking said screen, and a lever for shifting the change speed gear and for cutting in and out the screen shaking mechanism.

In testimony whereof I have hereunto set my hand.

CLEMENT F. STREET.

Witnesses:
A. S. FOWLER,
R. C. SMITH.